United States Patent [19]

Seifert

[11] Patent Number: 4,585,318
[45] Date of Patent: Apr. 29, 1986

[54] TRACKING DEVICE

[76] Inventor: Dieter Seifert, Siedlungsstrasse 12, Neuötting, Fed. Rep. of Germany, 8265

[21] Appl. No.: 570,349

[22] Filed: Jan. 13, 1984

[30] Foreign Application Priority Data

Jan. 14, 1983 [DE] Fed. Rep. of Germany ....... 3301046
May 7, 1983 [DE] Fed. Rep. of Germany ....... 3316731
Jul. 26, 1983 [DE] Fed. Rep. of Germany ....... 3326815

[51] Int. Cl.[4] .......................... G03B 21/00; F24J 3/02
[52] U.S. Cl. ......................................... 353/3; 126/424
[58] Field of Search .................... 353/3; 126/424, 425; 250/203 R; 350/289, 568

[56] References Cited

U.S. PATENT DOCUMENTS

| 3,656,844 | 4/1972 | Botskor | 353/3 |
|---|---|---|---|
| 4,108,019 | 8/1978 | Martin | 74/469 |
| 4,109,640 | 8/1978 | Smith | 126/271 |
| 4,145,021 | 3/1979 | Gaechter et al. | 126/425 X |
| 4,172,739 | 10/1979 | Tassen | 353/3 X |
| 4,295,621 | 10/1981 | Siryj | 353/3 X |

FOREIGN PATENT DOCUMENTS

| 2242880 | 9/1971 | Fed. Rep. of Germany . | |
|---|---|---|---|
| 1642545 | 3/1972 | Fed. Rep. of Germany . | |
| 2738665 | 3/1979 | Fed. Rep. of Germany . | |
| 2446931 | 1/1979 | France . | |
| 2480002 | 4/1980 | France . | |
| 2493486 | 5/1982 | France | 126/425 |
| 2505463 | 5/1982 | France . | |

OTHER PUBLICATIONS

Patents Abstract of Japan, vol. 7, No. 37, Feb. 15, 1983.
Whitford and Kron, "Photoelectric Guiding of Astronomical Telescopes," R.S.I., vol. 8, Mar. 1937, pp. 78-82.

Primary Examiner—Harry N. Haroian
Attorney, Agent, or Firm—Weingarten, Schurgin, Gagnebin & Hayes

[57] ABSTRACT

This invention concerns a tracking device which enables the positioning of an apparatus to trace a curved path. For example, they are suitable for solar devices such as photovoltaic generators, solar cookers and heliostates. Normally the tracking apparatus is mounted on a vertical axis, whereas according to the invention a necessary tilt to the horizontal axis is attained automatically through a directing limb by rotating the vertical axis, this making possible a trustworthy and uncomplicated manufacturable and manageable tracking device that can be easily adjusted to the local circumstances.

34 Claims, 16 Drawing Figures

TRACKING DEVICE

FIELD OF THE INVENTION

This invention concerns tracking devices for either accurate or an approximate tracking of apparatus in a curved path, e.g., solar technical receivers or reflectors.

BACKGROUND OF THE INVENTION

In order to simplify the description mostly photovoltaic generators will be used as receivers. In principle the tracking device is applicable to all devices, which trace a curved path. These include all the versions of solar devices which have to be aligned to the corresponding direction of the sunbeams, e.g., solar cookers and heliostats. The tracking device can also be used to track astronomical instruments (telescopes, antennae), to compensate the earth's rotation. Besides this, it is also applicable in the construction of machines and instruments, when an apparatus has to track an object, which traces a curved path. Examples of these are apparatus for working, mounting, transportation, identification or measuring, which have an effect on objects, which trace a curved path. Further it can for example trace moving objects, parts, griffers, filling devices or other moving apparatus (e.g., workpieces, tools and containers).

Due to the cost of the tracking, solar devices are often permanently mounted. Till now the tracking devices are mostly installed for radiation concentrating systems to adjust them according to the radiation direction. When the generator is moved around an axis which lies parallel to the earth's axis (equatorial mounting), the generator traces the sun's position through a simple rotation with the speed of 15° per hour. Such mountings are also used for telescopes. Depending on the seasonal differences in the paths of the sun the inclination of the generator to the axis is corrected periodically. Although their efficiency is simple they still need a cumbersome structure, because the slant of the rotating axis is determined by the latitude. Therefore solar apparatus often are mounted only on either a vertical or a horizontal axis, whereby a part of the utilizable energy is wasted. Further, the use of 2 axes, a vertical and a horizontal, with separate controls for the movement of each of the axes is already known. This device, however, requires additional expenses for the tilt of the horizontal axis. In very heavy telescopes, the equatorial mounting has been discarded and mounting on both, a vertical and a horizontal axis was applied. Similar solutions are known for tracking in machine and apparatus construction. In the case of robots, with separate controls for the movement of the several axes, problems with heavy tracking apparatus and high precision requirements make their construction for greater capacity and high rigidity troublesome.

German Offenlegungschrift No. 22 42 880 shows how the movement of points on the outer ring of a bearing set parallel to the equatorial plane can be transmitted to a telescope through a paralellogram guide. The telescope mount is mounted so that it rotates about one vertical and one horizontal axis, whereby difficulties in observing the sky in the vicinity of the poles are avoided. The large bearing required, disposed about the vertical shaft, and the large number of drive elements required, however, resulting in high cost.

French Pat. No. 24 80 002 describes a rod by means of which a parallactically mounted device is adjusted as a function of the declination of the object. Adjustment is made via a spindle on the hour axis, so that the spindle nut acts through the rod to achieve the desired diagonal position relative to the main axis.

U.S. Pat. Nos. 1,642,545 and 3,656,844 describe drives which produce an additional movement corresponding to the elevation or declination of the sun in the rotation of heliostats about the main axis. In U.S. Pat. No. 1,642,545 the main axis is vertical; an attempt is made to derive the position of the reflector corresponding to the daily and seasonal variations in the elevation with gear drives from a continuous azimuthal motion. U.S. Pat. No. 3,656,844 is based on a parallactically mounted main axis, so that only the seasonal change in the position of the sun is adjusted. Two reflectors are provided for the purpose, used alternately. The seasonal variation occurs automatically, using a combination of gear, curve, and plane coupled drives. The desired adjustment is achieved by shifting the two entrained coupling articulation points. In both cases, the expense required both for manufacture and construction is very high.

Regulation of tracking drives based on the measured deviation from exact alignment is described for example by A. E. Whitford and G. E. Kron (R.S.I, Vol. 8, March 1937, pp. 78/82). A drive with regulation is required for each axis. Additional measures are required to align the device approximately at the outset.

A precise tracking is important for concentrating solar devices and for heliostats and often in mechanical engineering. For other receivers a precise tracking is not necessarily required, because the impinging energy is proportional to the cosine of the angle between the receiver normal and the direction of the sunbeams, which has an negligible deviation from 100% for small angles. Because of the cooling-effect through natural convection and to improve the capacity during the day, even at very high sunposition, a minimum angle (e.g., 30°) may be desirable.

SUMMARY OF THE INVENTION

The purpose of the invention is to make possible trustworthy and uncomplicated manufacturable and manageable tracking devices that can be easily adjusted to the local circumstances.

This problem can be solved with tracking device through the traits identified in the claims. The apparatus to be tracked, for example a photovoltaic generator is mounted preferably on a tiltable horizontal axis, which in turn is mounted preferably on a rotatable vertical axis. The directing limb is arranged in the highest position (lowest inclination) in a vertical plane of symmetry and joins the tracked apparatus with a fixed point. In a normal case the rotation in solar devices follows through the corresponding azimuth of the sun. The inclination will hence be adjusted through the invented tracking device to a precise or an advantageous deviation of the corresponding height of the sun's position. As per later mentioned measurements or their combinations and modifications, special demands can be fulfilled. Variation possibilities are also given in the arrangement (e.g., shifting) of the axes and the design of the hinges.

BRIEF DESCRIPTION OF THE DRAWING

These and other features of the present invention will be better understood when taken in conjunction with the following detailed description, and further in view of the drawing, wherein.

DETAILED DESCRIPTION OF THE INVENTION

With the help of figures different versions are described and their functions illustrated. To start with the precise tracking systems are drawn (FIGS. 1-8). The direction towards which the apparatus is to be positioned, e.g., direction of the sunbeams, is marked as "S".

Figure 1:
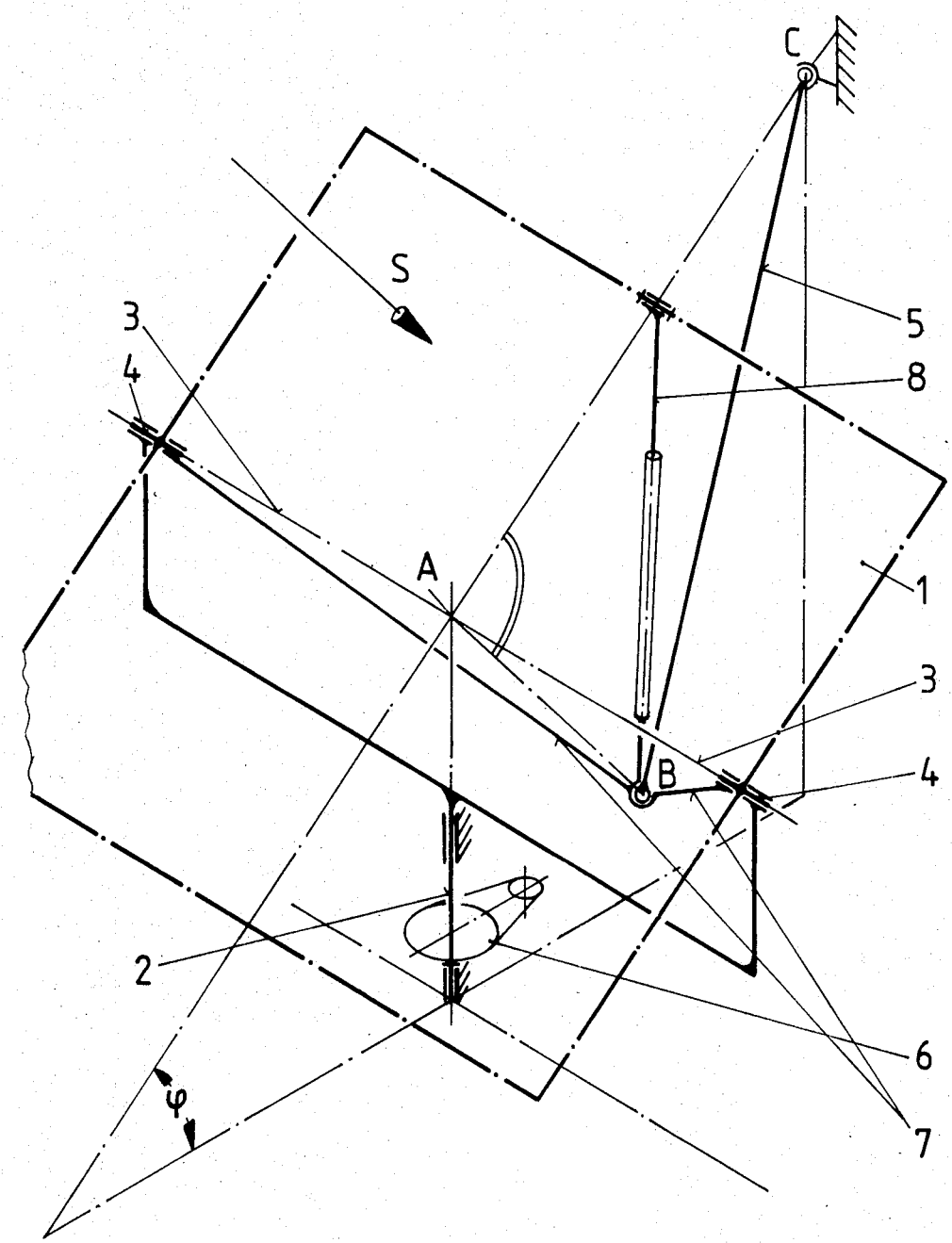
FIG. 1 is an isometric drawing showing a solar photovoltaic generator mounted on an embodiment of the device according to the invention at noon position at the time of equinox (March 21 and September 23)
Figure 2:
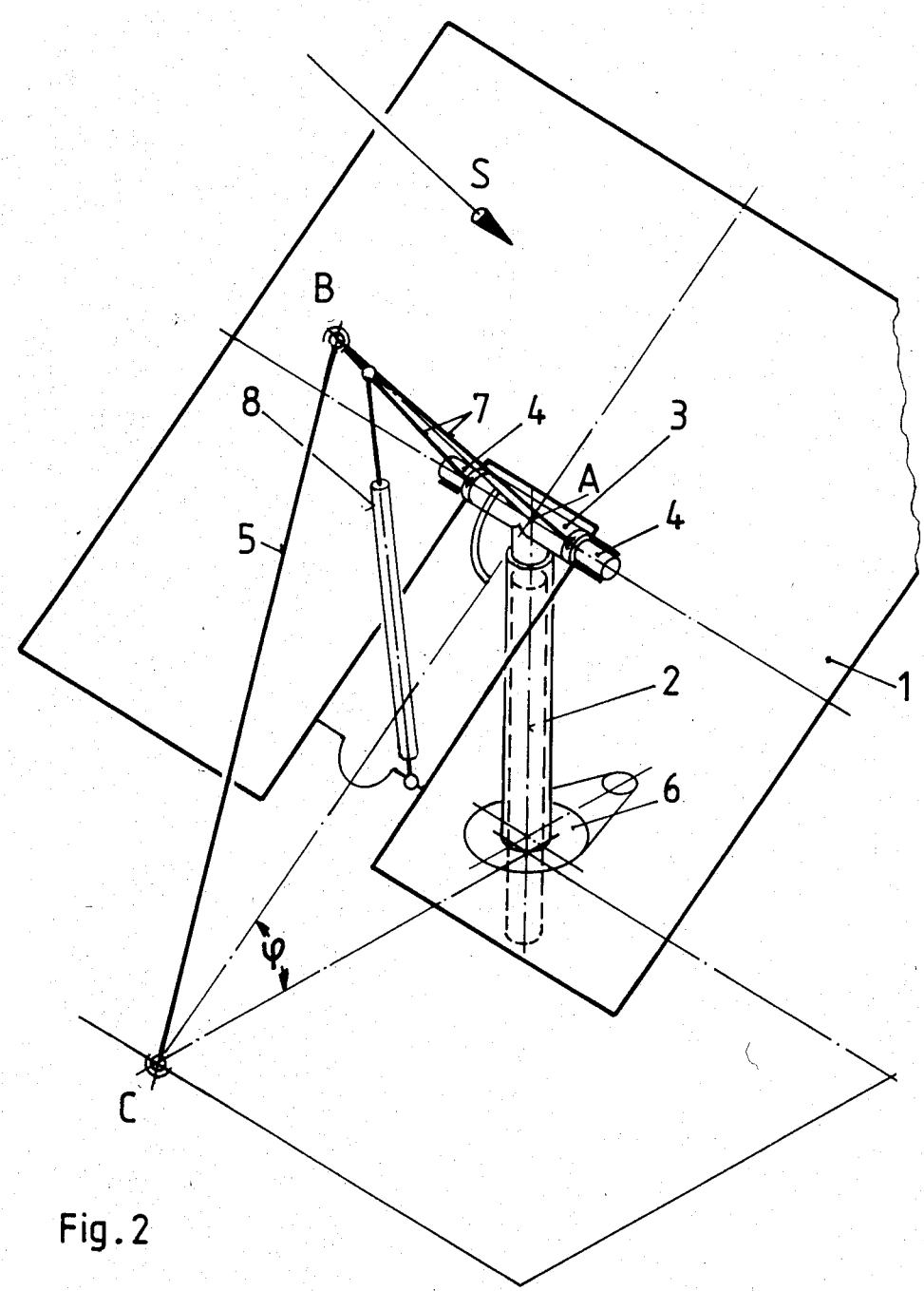
FIG. 2 is an isometric drawing similar to FIG. 1, but with the difference that it shows an alternative arrangement of the directing limb in the frontal position.

FIGS. 1 and 2 show examples in isometric drawings. The generator 1 is in the noon position at the time of equinox. On the vertical rotatable axis 2 is mounted the horizontal tiltable axis 3, on whose bearing points 4, the generator 1 is placed. The intersection of both these axes is marked with "A". The geographical latitude $\phi$ of the mounting location is assumed to be 38°. The slope of the generator during its rotation around the vertical axis will be adjusted through the directing limb 5. The accompanying hinge "B" of the directing limb is attached to the generator through the limbs 7 and 8, while the hinge "C" is mounted permanently on a point in the north-south direction behind the axis 2 (FIG. 1) or in front of axis 2 (FIG. 2). The rotation of the generator around the main axis is brought about by drive 6.

Figure 3:
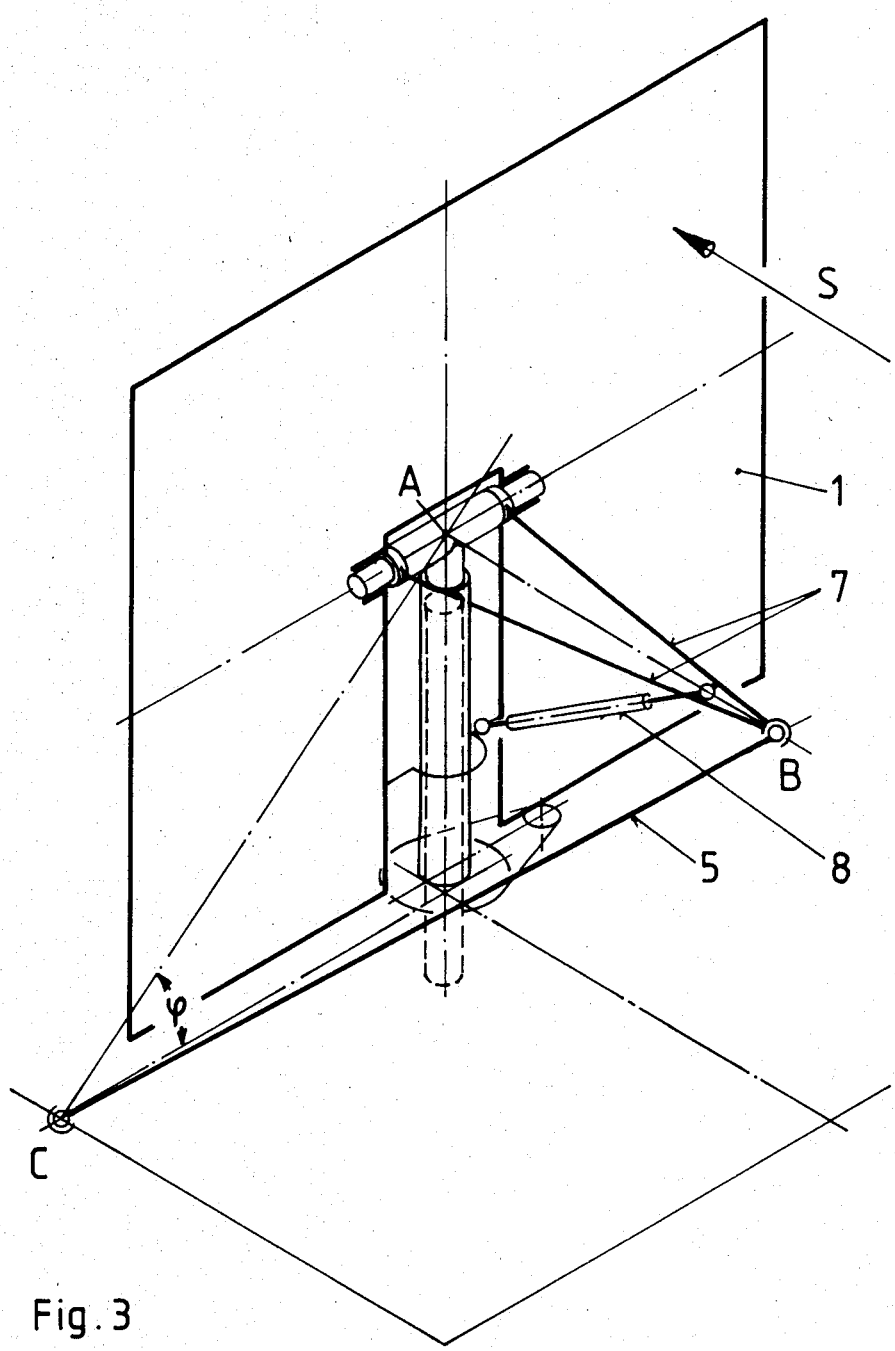
FIG. 3 is an isometric drawing similar to FIG. 2, but with the device in a position for sunrise.

A precise tracking will be obtained if the connecting line "AC" has an angle $\phi$ to the horizontal, where $\phi$ is the latitude of the mounting location and the line "AB" is perpendicular to "AC". Under these conditions the hinge "B" moves in an arc, whose normal to the area is parallel to the earth's axis. The movement of the normal of the generator plane will be obtained according to the equatorial mounting, but with the difference that the generator will be advantageously mounted. FIG. 3 shows the generator after its rotation to east or west respectively. The inclination of the generator will be obtained automatically through the directing limb by the rotation of the vertical axis by 90°.

Figure 4:
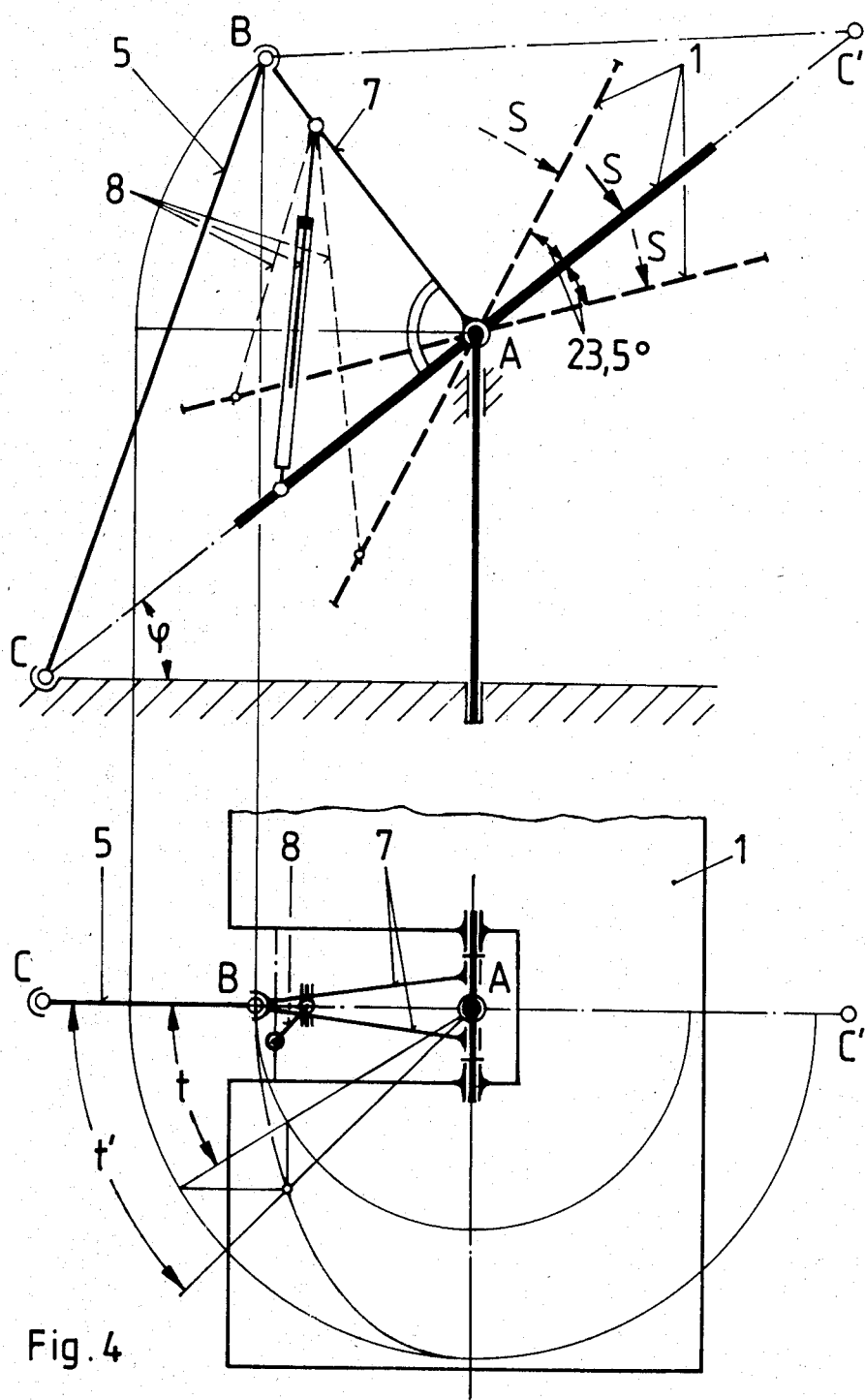
FIG. 4 is a side view of a photovoltaic generator mounted on an embodiment of the device according to the invention showing alternative positions for the hinge C of the directing limb in side view and in a plane view from above.

According to FIG. 4 for exact tracking, the placing of the directing limb 5 between "B" and "C" is also possible.

Measures to account for the seasonal differences in the positions of the sun towards the earth's axis are explained below.

The above view of FIG. 4 serves to explain the necessary rotation of the vertical axis corresponding to the azimuth of the sun during the course of the day. To achieve an exact positioning the point "B" must rotate around the axis "AC" with a speed of 15° per hour. This demands a variable movement around the vertical axis. Between the time angle "t" and the corresponding angle "t'" of the vertical axis (see above view in FIG. 4) one can apply the following equation:

$$\tan t' = \tan t / \sin\phi \tag{1}$$

The counting of the angles begins at noon.

Figure 5:
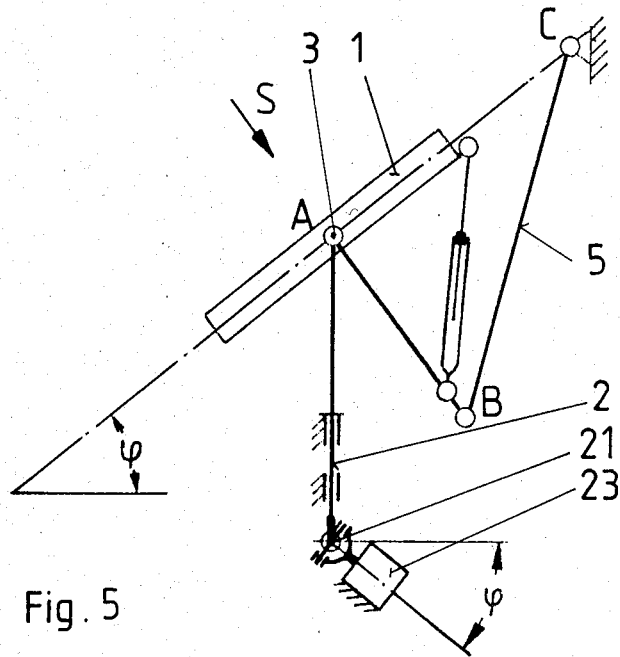
FIG. 5 is a drawing showing a photovoltaic generator mounted on an embodiment of the device according to the invention in the noontime indicating that the variable movement of the vertical axis can be obtained by use of a cardan joint with the aid of a constantly moving drive, e.g., a motor.

This variable movements may be obtained, e.g., by the use of a cardan joint 21 from a constantly moving drive 23, as shown in FIG. 5.

The positioning according to FIG. 1 (with the hinge "C" above the intersection point "A") is than always especially suitable, when a favourable attachment for point "C" is available, e.g., a house. The point "C" can also be attached to a rod, to a stretched string or even to a tied net.

Figure 6:
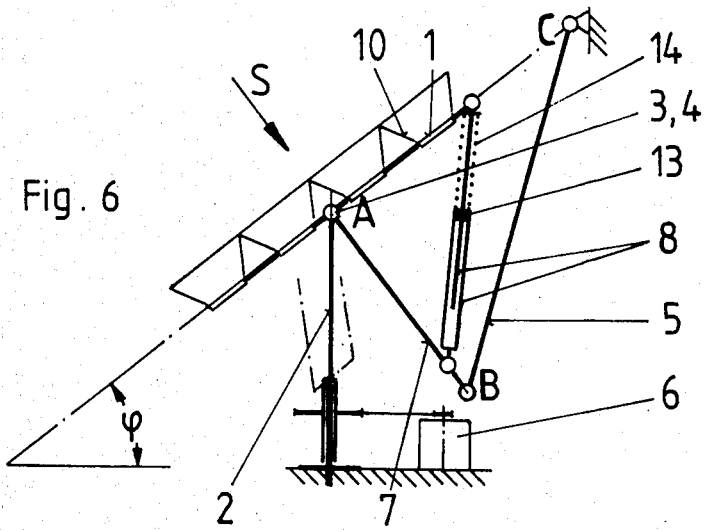
FIG. 6 is a drawing showing the above-mentioned device for an application with solar cells with concentrators (e.g., mirror funnels)
Figure 7:
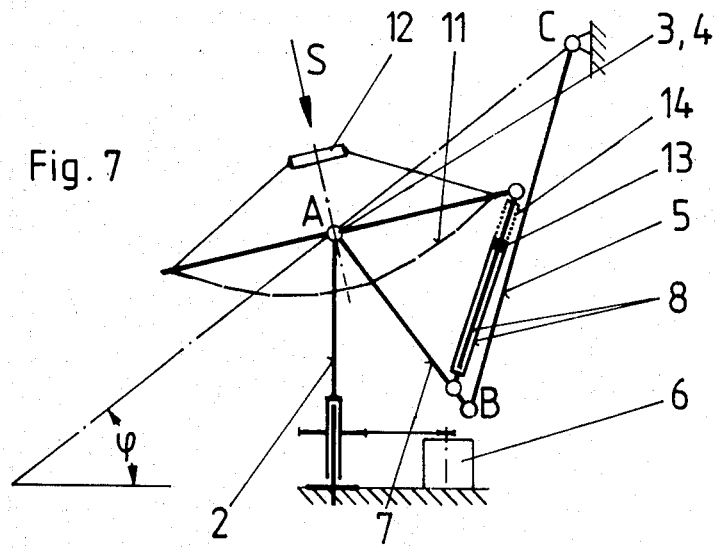
FIG. 7 is a drawing showing the above-mentioned device for a different application with a concentrator.
Figure 8:
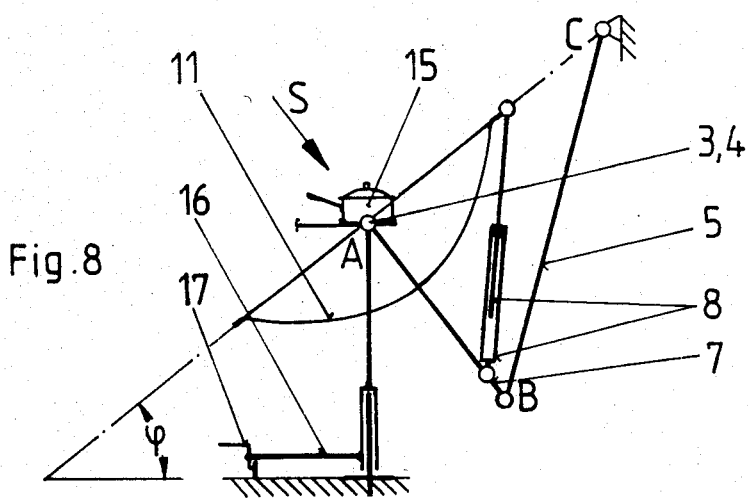
FIG. 8 is a drawing showing the device used for a solar cooker with a parabolic mirror.

In FIGS. 6-8, three applicable examples of radiation concentrating apparatus are drawn. FIG. 6 shows a solar generator with a mirror funnel 10 which reflects the incoming rays onto solar cells 1. FIG. 7 shows a concentrator 11 which is made up of separate flat mirrors that reflect onto an accompanying receiver 12. These arrangements (e.g., through combining solar cells with cheap mirrors or lenses) make it possible, to attain a reasonably priced energy source, with a possible size ranging from the smallest generator to a power station (consisting of many individual generators).

The designing of the concentrators and receivers will be adapted to the special requirements, e.g., an equal distribution of the radiated energy on the solar cell surface.

FIGS. 6 and 7 also show a possibility of safeguarding the apparatus against damage such as adverse weather conditions or high cell temperatures. The positioning limb 8 will be so lengthened through the disengagement of the threaded nut 13 from the spring 14 that the apparatus will tilt downwards to a safe position (indicated by a dotted line in FIG. 6).

FIG. 8 shows a solar cooker with an accompanying parabolic-mirror. The pot 15 can be replaced by other equipments to be heated. Similarly, in certain cases the parabolic-mirror can be replaced by other radiation concentrating equipments, e.g., mirror, lenses and their combinations. The aligning of the vertical axis in FIG. 8 can be done manually with arm 16, placed on axis 2, held in position by the tightening device 17. In this way very simple and effective solar cookers can be manufactured.

If measures are taken to see that the directing limb 5 is always under tension, than either a string, a chain or any other strain creating limb can be used. This strain can be obtained through the distribution of the weight on the tilted axis 3, by counterbalancing or through the force of a spring. Care has to be taken through aerodynamic styling of the generators, such that the wind force brings the directing limb into strain positions only.

The hinges can be ball-and-socket joints, hooks, rings, eyes, loops or similar elements, which rotate each other or even rope fixings.

Tracking devices can also be used to arrange Heliostates. The mirror area will be so adjusted, that it is perpendicular to the halved angle between the changeable incoming direction of the sunbeams and the unchangeable direction of the Heliostate receiver. The mirror retains a basic attitude (normal position) according to the condition of placement and a tracking by half of the angle, which an accurate accompanying generator would otherwise require.

Figure 9:
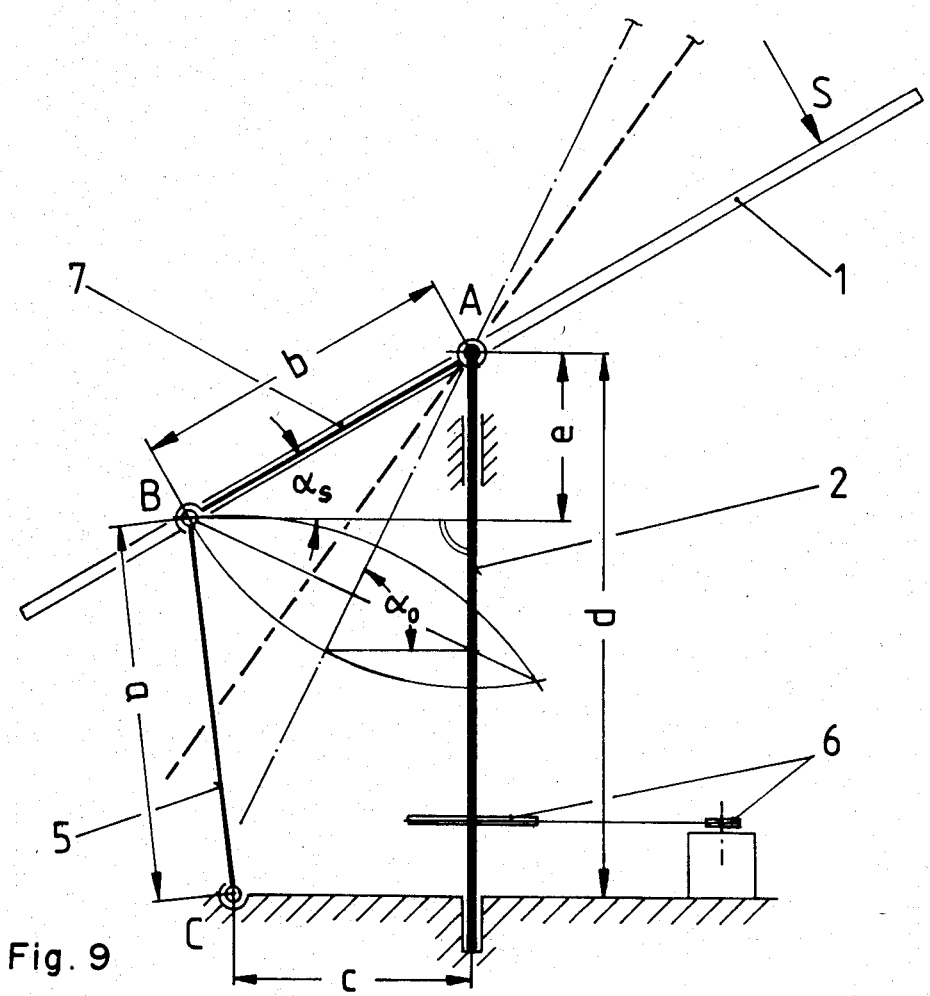
FIG. 9 is a side view of a device according to another embodiment of the invention for special demands.
Figure 9A:
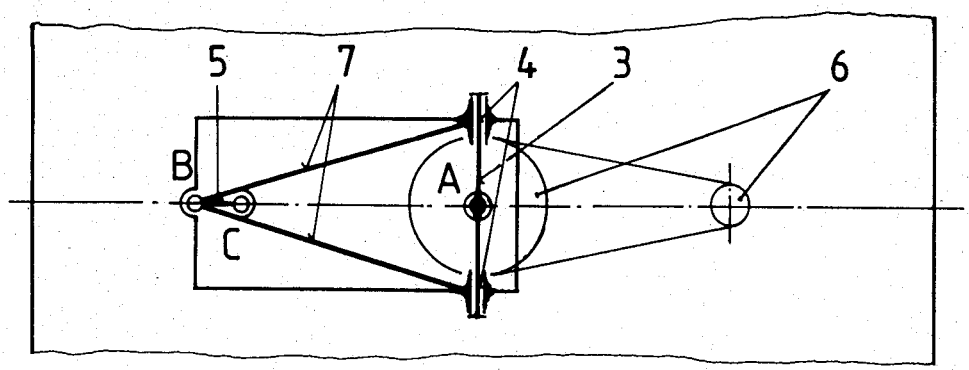
FIG. 9a is a plan view from above of the device of FIG. 9.

For lesser precision demands or for special paths to be traced this invention enables one to produce simpler tracking devices. FIG. 9 and FIG. 9a show the positioning of such a mechanism. The limbs are numbered according to FIG. 1. The directing limb 5 is connected to the generator. In simple models the adjustability corresponding to the declination of the sun is abandoned. Through the selection of suitable lengths "a" to "e" it is possible to couple the rotation and tilting of the generator, so that an approximate position can be attained. Following equations are valid between the dimension and the angle of inclination "$\alpha_s$" (noon position) and "$\alpha_o$" (alignment towards east or west, respectively):

$$\sin\alpha_s = e/b \quad (2)$$

$$\sin\alpha_o = (b^2 + c^2 + d^2 - a^2)/2bd \quad (3)$$

Figure 10:
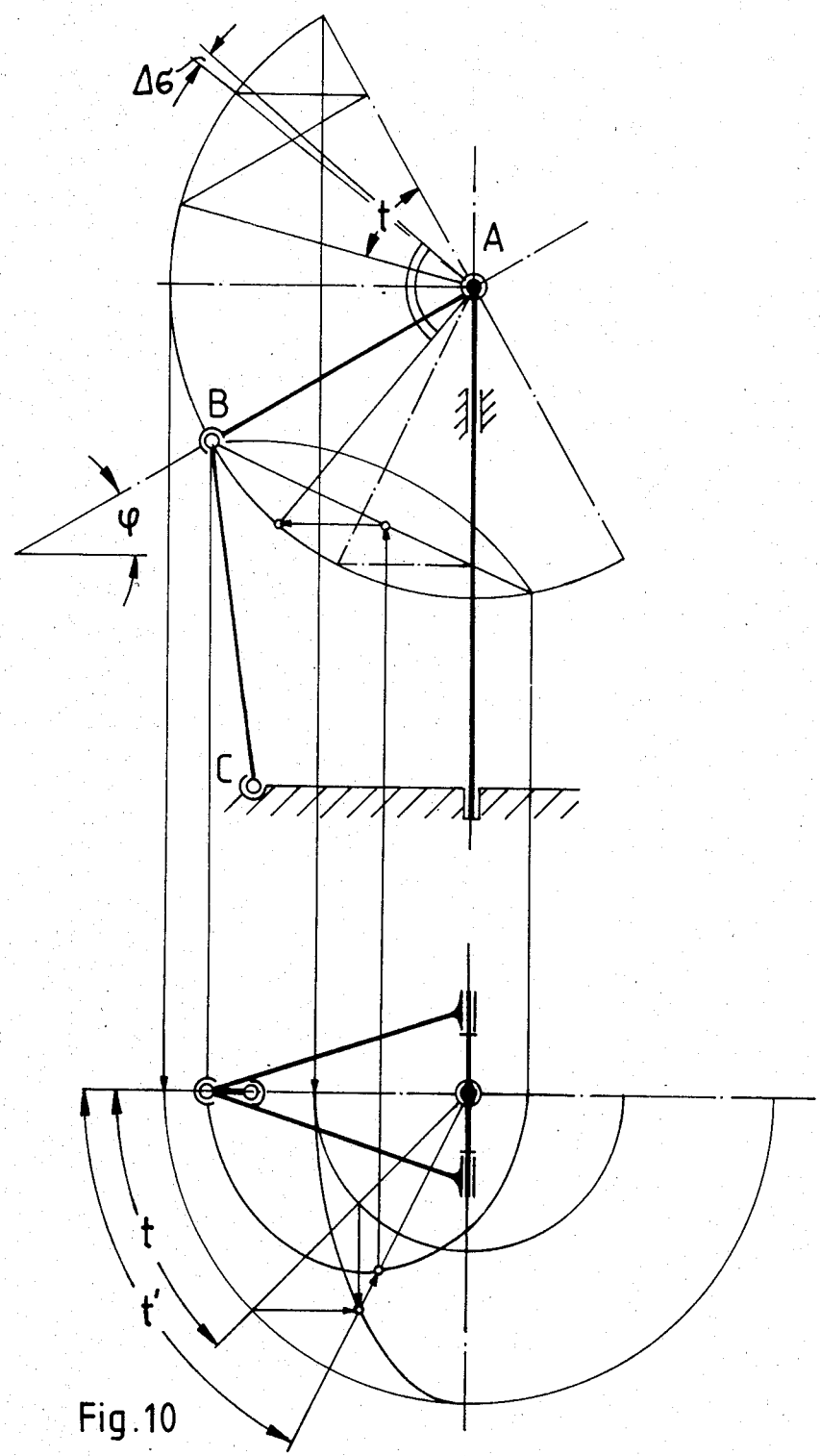
FIG. 10 is a drawing showing the construction of the angle of inclination of a system corresponding to FIG. 9 at noon and at sunrise and sunset position.

The construction of the angle is plotted in FIG. 10. A favourable positioning is achieved, if one chooses for "$\alpha_s$" the latitude of the place where it will be mounted or a minimum angle of inclination and for "$\alpha_o$" values between 50° and 80°, preferably in the range of 65°.

For the approximate tracking the arrangement of the point "C" according to FIG. 1 is possible, too.

In the selection of the length of the limbs, the mechanical rules must of course be observed, to avoid blocking. A rotation over the east or west direction, respectively (in the summer half-year), is possible.

Through the application of two directing limbs 5, the stability in positioning especially in very big generators will be increased. Both the limbs are in such a case placed symmetrical to the south direction and at the noon position in the vertical plane through the vertical axis of the mechanism.

Figure 11:
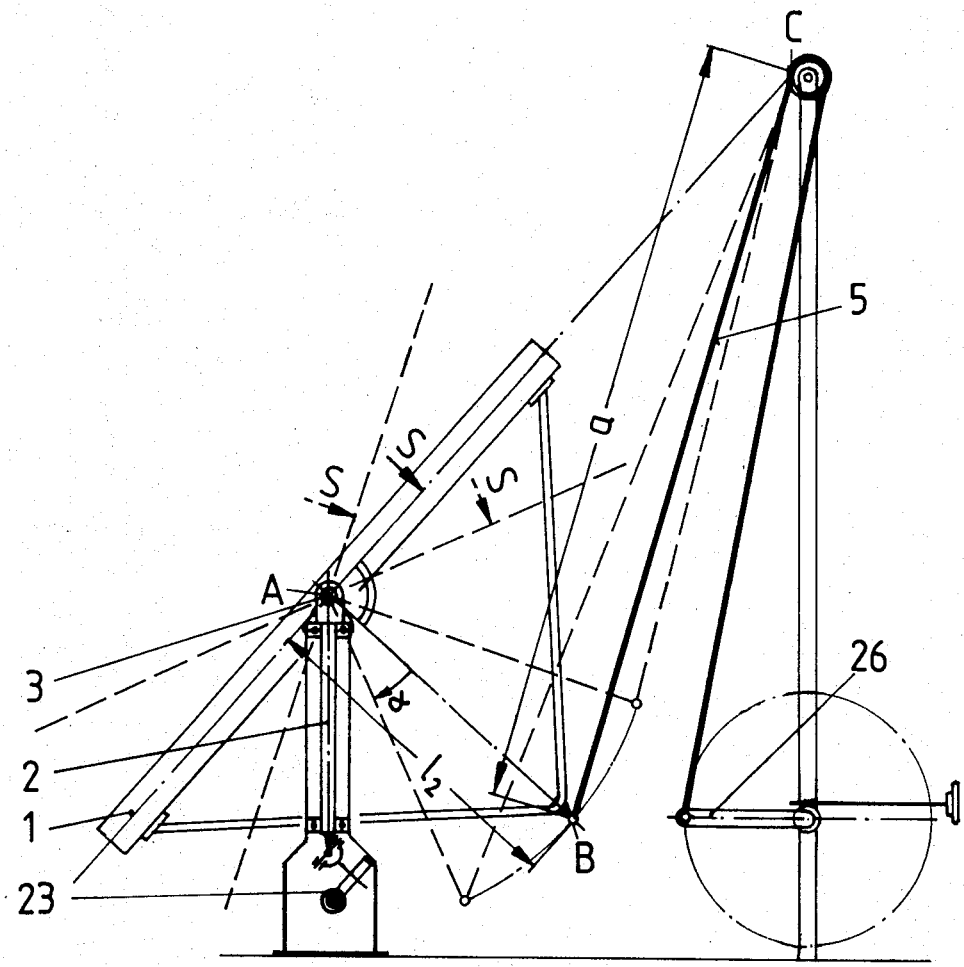
FIG. 11 is a drawing showing a device with seasonal positioning by changing the length of the directing limb by a crank.

FIG. 11 shows how the deviation in angle $\Delta\sigma$ between the sun's position and the perpendicular on the generator during the equinox can be obtained.

Hereby, just like in a precise positioning of the generator with an hour-angle "t" the vertical axis will be rotated corresponding to the azimuth "t" of the sun.

There are a series of possibilities to suit the tracking device to the standard needs of location and seasonal changing positions of the sun. In FIGS. 1 to 8, for this purpose a rod 8 adjustable in length is drawn schematically through which the inclination of the generator in respect to the axis "AC" can be adjusted. Further through the change in length "a" (distance "BC") and-/or of the distance "c" and/or shifting of the point "C", the angle of inclination and the range of adjustment can be changed within wide limits.

FIG. 11 shows a tracking device with seasonal positioning through the change of length of the directing limb 5 over a crank 26.

Figure 12:
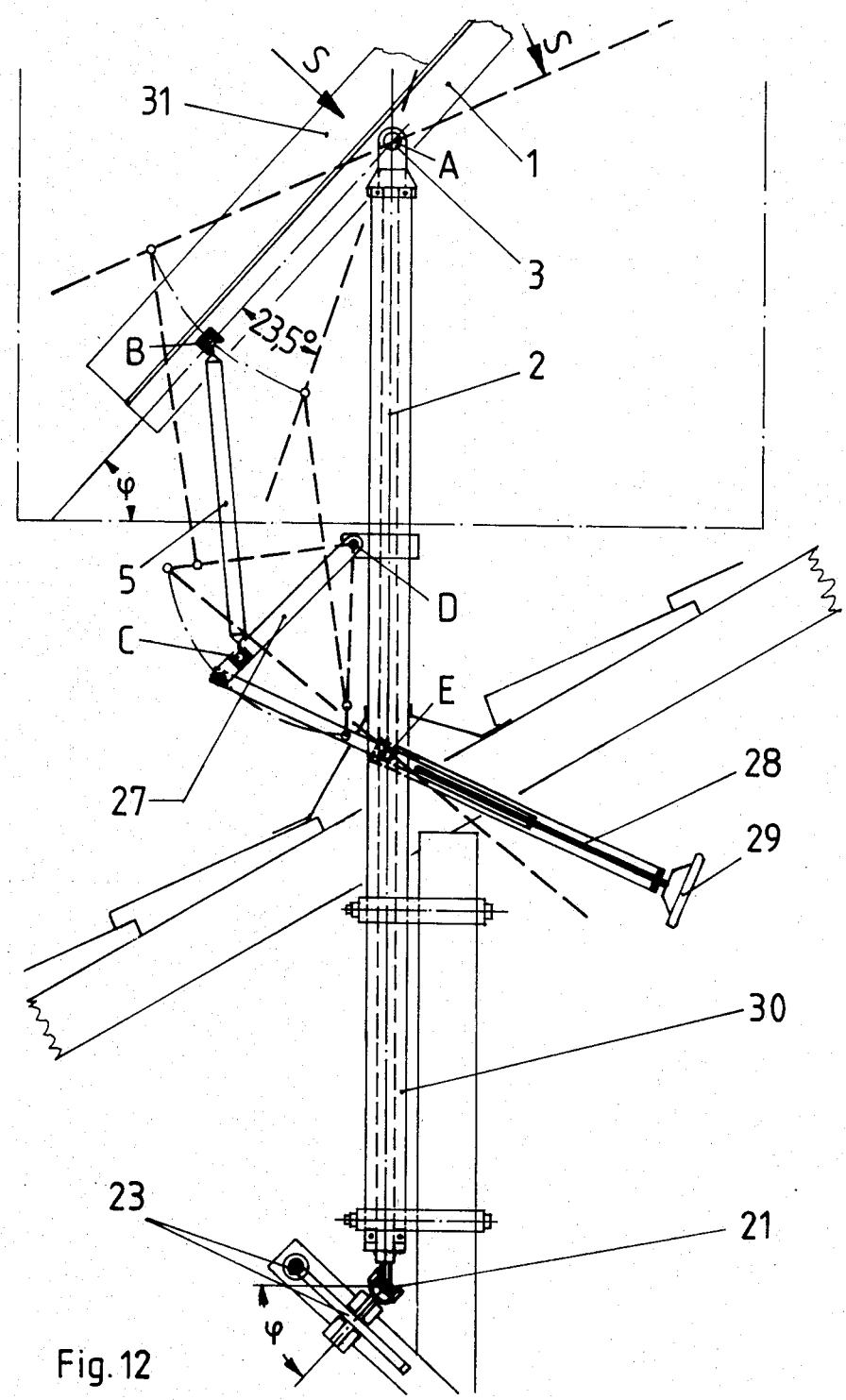
FIG. 12 is a drawing showing an embodiment of a device mounted on the roof of a house with a hinge of the directing limb connected to a rocker-arm for seasonal positioning by moving the hinge of a curved path.

In FIG. 12 the hinge "C" is tied into rocker-arm 27, so that it can be adjusted with the hand-wheel 29 and spindle 28. It is shown an apparatus tied onto the roof of a house where the hand-wheel 29 is placed inside the house.

Figure 13:
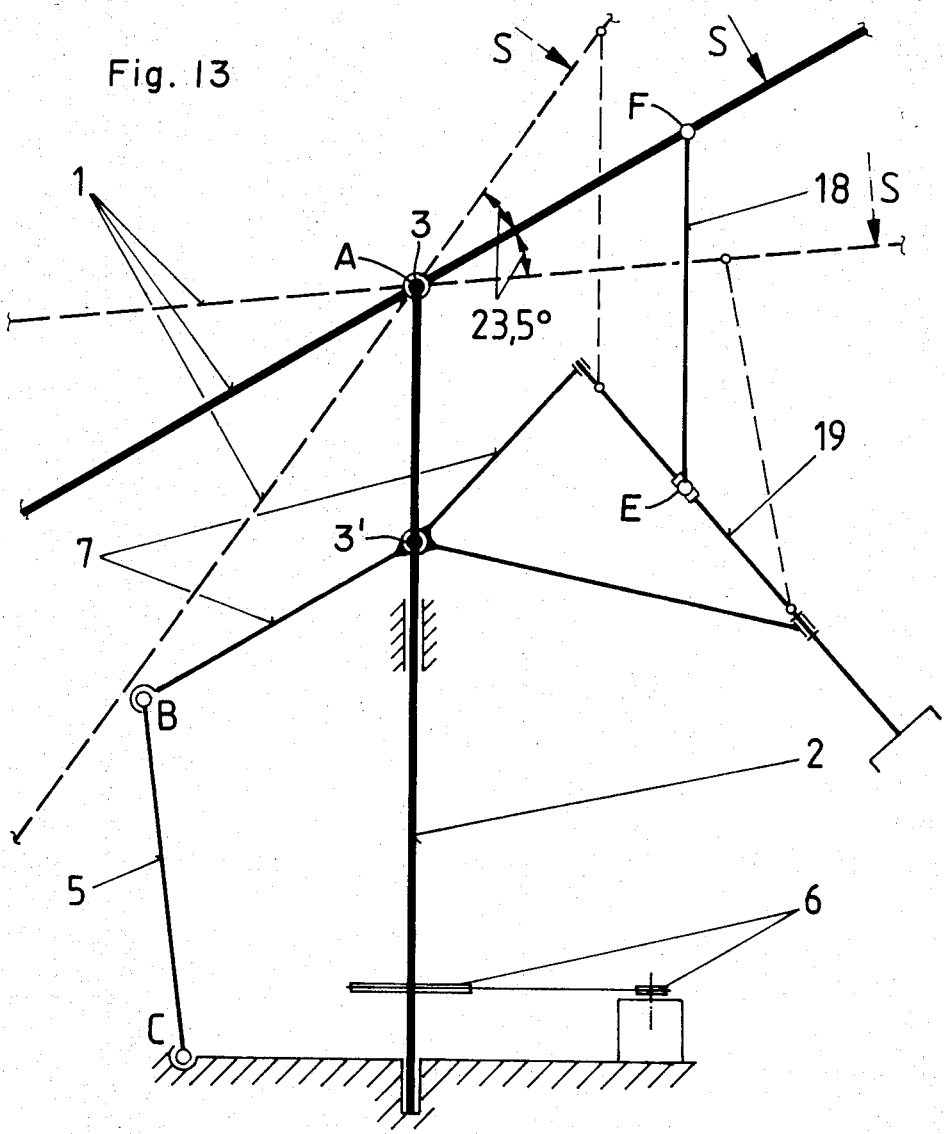
FIG. 13 is a drawing showing a side view of an alternative arrangement to FIG. 12 with a mounting limb having an extension for mounting an adjustable coupling arm for seasonal positioning.
Figure 13A:
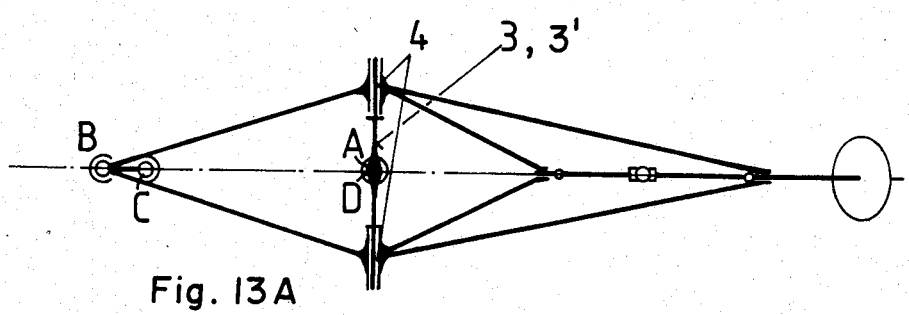
FIG. 13a is a plan view from above of the arrangement of FIG. 12.

FIG. 13 and FIG. 13a show an alternative arrangement to FIG. 12. The readjustment according to the seasonal declination of the sun in this case will be achieved through an adjustable coupling arm 18 between the generator 1 and the limb 7, adjustable over the spindle 19. The limb is extended over its bearing on the horizontal axis. The rotation point "D" of the generator lies outside the rotation point D, which is the intersection point of the axes 2 and 3. This enables a good utilization of the room conditions and an additional transmission of the inclination angle. A further tilting can also be achieved through firm sideway impacts on the directing limb 5 which turn a flexible directing limb 5. Arrangements according to FIGS. 1-8 a minimum angle $\phi$ is advantageous. Nearer the equator the hinge "C" can be adjusted to a larger angle than the latitude and the deviation can be corrected by the corresponding change in the effective length of the directing limb 5 during the day time. This change is especially simple to realize if the rope is passed over the point "C" and then below and then tied to a disc or a lever on the man axis. In FIG. 9 the values for cos $\Delta\sigma$ for the various systems at a mounting on the 30th latitude are plotted, whereby the ordinates correspond to the proportion of the gathered to the gatherable radiation capacity for the time point "|t|" (=absolute time distance from noon). For a precise tracking system this relation is equal to 1 (curve "i"). In the case of a fixed-mounted generator, that is mounted inclined to the corresponding latitude a curve "a" (summer solstice or winter solstice, where the curve ends at approximately 5 o'clock) and a curve "b" (equinox) is obtained. Curve "c" corresponds to a 30°-inclined generator, which will only trace an azimuth, at equinox. The three curves "d", "e" and "f" correspond to the arrangements show in FIGS. 9 and 10 the dimensions chosen without seasonal adjustment for the winter solstice ("d"), equinox ("e") and summer solstice ("f"). With seasonal adjustments according to FIG. 13 the curves "g", "e" and "h" are valid for the winter solstice, equinox and summer solstice, respectively.

If the arrangement corresponding to FIG. 9 is to be adjusted to the declination only in the winter half-year, so that by the winter solstice the generator is inclined by 23.5° against the original position (dotted representation in FIG. 9), then curves "e", "f" and "g" are valid. This combination is for example especially advantageous, if a minimum angle of inclination is not to be underpassed.

Figure 14:
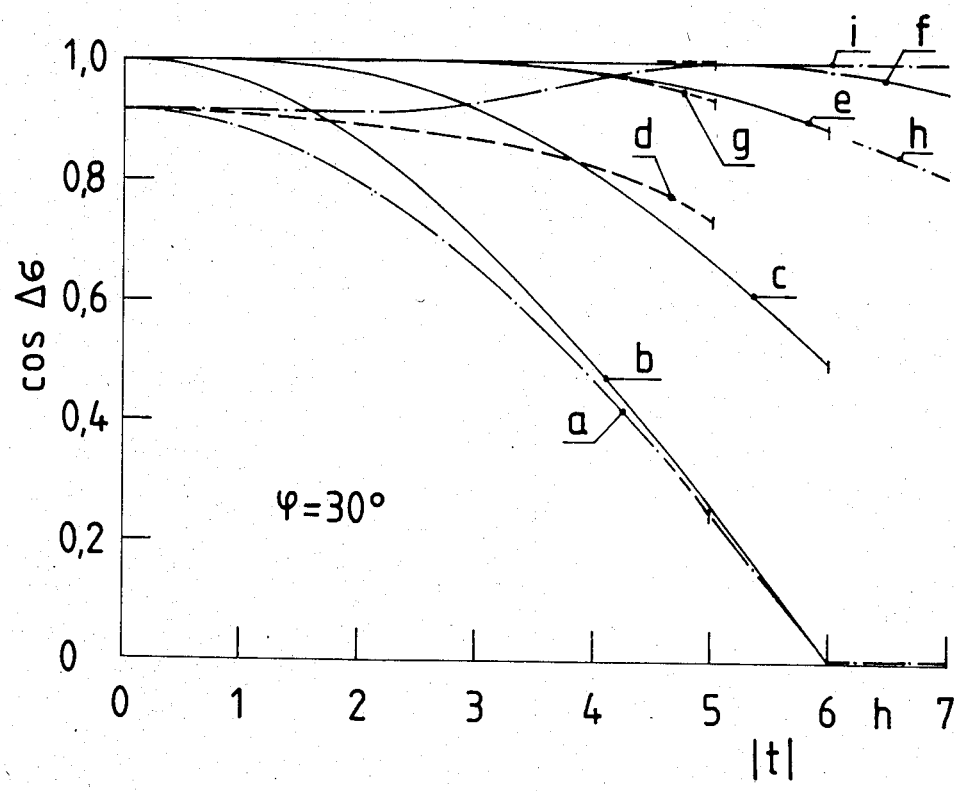
FIG. 14 is a diagram for the proportion of the gathered to the gatherable radiation capacity as a function of the time distance from noon for various embodiments.

FIG. 14 shows, that for a tracking according to this invention advantageous versions for the individual situations can be achieved.

For the driving of the tracking device there are several possibilities: for example a direct current motor can be used for photovoltaic generators, the application of works with spring or weight storage or the insertion of various motors, hydraulic and pneumatic, as well as other driving sources are also possible.

In order to achieve the appropriate positioning of the tracking device, measures of control can be applied. For example, the controls can work according to a time program. By comparing the actual and desired values and with the help of its measurement, a control signal for the accompanying drive can be derived. For example, on a wall that has been arranged perpendicular to the generator area, by the deviation from the exact position a sunny- and a shady-side is produced, which can be used to control the drive. A switch can be applied that always switches a step further as soon as deviation from the right position is observed. Before sunrise, it has to be brought back to the original position. Also an extended crank gear that transforms a constant rotating movement into an oscillatory movement with a corresponding speed is applicable. Then the tracing can be made with the aid of an undirectional motor.

For concentrators, according to FIGS. 6 and 7, the distribution on the receiver is unequal as soon as the tracing deviates. This assymmetry can serve to regulate the positioning.

With regard to its application in mechanical engineering many possibilities to control the positioning are open; for example with the aid of electric or optical, or by means of contacts. Since the positioning of the object that has to be traced is mostly done mechanically, the tracking device can be easily adjusted, e.g., over contacts.

The centre of gravity of the tracked apparatus can be layed in the intersection of the vertical and horizontal axes, so that the rotating device will be strained only through friction and wind forces.

Through the displacement of the centre of gravity out of this rotation point or through the slanted positioning of axis 2 the device can be stressed intentionally.

Since the motor affects only one rotation axis, several apparatus can be run simultaneously with a single motor for example through chains, cogged belts or by coupling limbs.

Tracking devices with the hinge "C" above point "A" can be so formed, that a complete rotation of the vertical axis is possible enabling a complete circular path to be traced.

The tracking devices can be adjusted to the local circumstances by simple means, so that standardization is possible. The elements of the tracking device are themselves easily available and protectable against weather conditions. Hence, this invention facilitates the manufacturing and running of the tracking devices, so that an obstruction to the intensive technical utilization of solar energy can be overcome.

What is claimed is:

1. A device for maintaining a first object in alignment with a second object along a curved path around a first axis, said device comprising:
   a rotatable shaft having a second axis, said first object being mounted rotatably on said shaft around a third axis, said third axis being perpendicular to said second axis;
   drive means for rotating said rotatable shaft around said second axis;
   a first hinge connected by at least one limb to said first object;
   a second hinge arranged on a fixed relationship to said first axis and intersecting said second axis and said third axis, said second hinge being connected to said first hinge by a directing limb to tilt said first object around said third axis when said drive means rotates said shaft around said second axis.

2. The device of claim 1, wherein
   said first object is a solar device, said second object is the sun, and said first axis is the earth's axis.

3. The device according to claim 1, wherein the inclination of said first object with respect to said line parallel to said first axis is adjustable by means of an adjusting link arranged between said mounting limb and said first object.

4. The device according to claim 1, wherein the length of said directing limb is adjustable, so that the inclination of said first object with respect to said line parallel to said first axis is adjustable.

5. The device according to claim 1, wherein
   said directing limb comprises pliable, strain-creating limb material, including one of a rope, a string, and a chain.

6. The device according to claim 5, wherein
   the length of said directing limb is adjustable by means of a crank device.

7. The device according to claim 1, wherein
   said drive means is connected to said shaft by means of a cardan joint.

8. The device according to claim 1, wherein
   said second axis is vertically disposed.

9. The device according to claim 1, wherein said third axis intersects said second axis.

10. The device according to claim 1, further including:
    a plurality of means, each for maintaining a first object in correct or in approximate alignment with a common second object, each of said plurality of means being driven by a single common drive means with the shafts of said devices being coupled mechanically for synchronized rotation.

11. A device for maintaining a first object in alignment with a second object moving on a curved path around a first axis, said device comprising:
    a rotatable shaft having a second axis, said first object being mounted rotatably on said shaft around the third axis, said third axis being perpendicular to said second axis;
    drive means for rotating said rotatable shaft around said second axis;
    a first hinge mounted on said first object;
    a second hinge connected by a directing limb to said first hinge to tilt said first object around said third axis when said drive means rotates said shaft around said second axis, said second hinge being mounted movably on a curved path, lying in the plane containing said second axis and a line parallel to said first axis, wherein the tilting angle ($\alpha_s$) of said first object as measured in said plane is adjustable.

12. The device according to claim 11, wherein
    said first object is a solar device, said second object is the sun, and said first axis is the earth's axis.

13. The device according to claim 11, wherein
said directing limb comprises a pliable strain-creating limb material, including a rope, a string, and a chain.

14. The device according to claim 11, wherein
said drive means is connected to said shaft by means of a cardan joint.

15. The device according to claim 11, wherein
said second axis is vertically disposed.

16. The device according to claim 11, wherein said third axis intersects said second axis.

17. The device according to claim 11, further including:
a plurality of means, each for maintaining a first object in correct or in approximate alignment with a common second object, each of said plurality of means being driven by a single common drive means with the shafts of said devices being coupled mechanically for synchronized rotation.

18. The device according to claim 11, wherein
the tilting angle ($\alpha_o$) of said first object is between 50° and 80° when said shaft has been rotated by 90° from the position of said minimum tilting angle ($\alpha_s$).

19. A device for maintaining a first object in alignment with a second object moving on a curved path around a first axis, said device comprising:
a shaft rotatably mounted around a second axis, said first object being mounted rotatably on said shaft around a third axis, said third axis being perpendicular to said second axis.

20. The device of claim 19, wherein
said first object is a solar device, said second object is the sun, and said first axis is the earth's axis.

21. The device according to claim 19, wherein
said directing limb comprises one of a pliable strain-creating limb material, including a rope, a string, and a chain.

22. The device according to claim 19, wherein
said drive means is connected to said shaft by means of a cardan joint.

23. The device according to claim 19, wherein
said second axis is vertically disposed.

24. The device according to claim 19, wherein said third axis intersects said second axis.

25. The device according to claim 19, further including:
a plurality of means, each for maintaining a first object in alignment with a common second object, each of said plurality of means being driven by a single common drive means with the shafts of said devices being coupled mechanically for synchronized rotation.

26. The device according to claim 11, wherein
the tilting angle ($\alpha_o$) of said first object is between 50° and 80° when said shaft has been rotated by 90° from the position of said minimum tilting angle ($\alpha_s$).

27. A device for maintaining a first object in alignment with a second object moving on a curved path around a first axis, said device comprising:
a shaft rotatable around a second axis, said first object being mounted rotatably on said shaft around a third axis, said third axis being perpendicular to said second axis;

drive means coupled to said shaft for rotataing the same around said second axis;

at least one first hinge connected to a mounting limb, said mounting limb being mounted rotatably around a fourth axis, said fourth axis being parallel to said third axis and mounted on said second axis, said mounting limb having an extension arranged opposite to said first hinge with respect to said second axis;

at least one second hinge mounted fixedly and connected by a directing limb to said first hinge to tilt said first object around said third axis when said drive means rotates said shaft around said second axis;

a third hinge mounted shiftably on said extension and a fourth hinge mounted on said first object and being connected to said third hinge by a coupling limb wherein the minimum tilting angle ($\alpha_s$) of said first object with respect to the horizontal plane is adjustable.

28. The device of claim 27, wherein
said first object is a solar device, said second object is the sun, and said first axis is the earth's axis.

29. The device according to claim 27, wherein
said directing limb comprises a pliable strain-creating limb material, including one of a rope, a string, and a chain.

30. The device according to claim 27, wherein
said drive means is connected to said shaft by means of a cardan joint.

31. The device according to claim 27, wherein
said second axis is vertically disposed.

32. The device according to claim 27, wherein said third axis intersects said second axis.

33. The device according to claim 27, further including:
a plurality of means, each for maintaining a first object in correct or in approximate alignment with a common second object, each of said plurality of means being driven by a single common drive means with the shafts of said devices being coupled mechanically for synchronized rotation.

34. The device according to claim 27, wherein
the tilting angle ($\alpha_o$) of said first object is between 50° and 80° when said shaft has been rotated by 90° from the position of said minimum tilting angle ($\alpha_s$).

* * * * *

UNITED STATES PATENT AND TRADEMARK OFFICE
CERTIFICATE OF CORRECTION

PATENT NO. : 4,585,318

DATED : April 29, 1986

INVENTOR(S) : Dieter Seifert

It is certified that error appears in the above—identified patent and that said Letters Patent is hereby corrected as shown below:

ABSTRACT: line 4-5, "heli-ostates." should read --heli-ostats.--.

Column 1, line 59, "paralellogram" should read --parellelogram--.

Column 1, line 65, "resulting" should read --result--.

Column 2, line 34, "neglegible" should read --negligible--.

Column 2, line 37, "sunposition" should read --sun position--.

Column 4, line 19, "for exact" should read --for the exact--.

Column 4, line 20, " "C" " should read --"C'"--.

Column 4, line 38, "This variable movements" should read --These variable movements--.

Column 4, line 42, "than" should read --then--.

Column 5, line 12, "than" should read --then--.

Column 5, line 20, "rotate each" should read --rotate about each--.

Column 5, line 22-23, "Helios-tates" should read --helio-stats--.

UNITED STATES PATENT AND TRADEMARK OFFICE
CERTIFICATE OF CORRECTION

PATENT NO. : 4,585,318

DATED : April 29, 1986

INVENTOR(S) : Dieter Seifert

Page 2 of 2

It is certified that error appears in the above—identified patent and that said Letters Patent is hereby corrected as shown below:

Column 5, line 26, "Heliostate" should read --heliostat--.

Column 6, line 3, " "t" " should read --"t'"--.

Column 6, line 17, "into" should read --onto--.

Column 6, line 42, "man" should read --main--.

Column 6, line 56, "show" should read --shown--.

Column 7, line 34, "optical, or" should read --optical sensors, or--.

Column 8, line 7, "fixed relationship" should read --line parallel--.

Column 10, line 10, "rotataing" should read --rotating--.

Signed and Sealed this

Twenty-second Day of December, 1987

*Attest:*

DONALD J. QUIGG

*Attesting Officer*  *Commissioner of Patents and Trademarks*